Nov. 19, 1929.    J. E. THORNTON    1,736,554
COLOR PHOTOGRAPHY AND SENSITIZED MATERIAL THEREFOR
Filed July 1, 1925
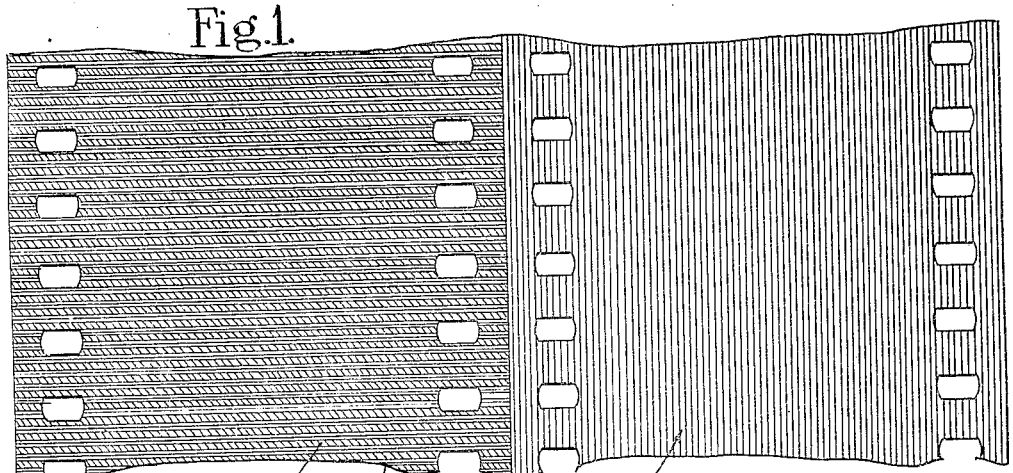
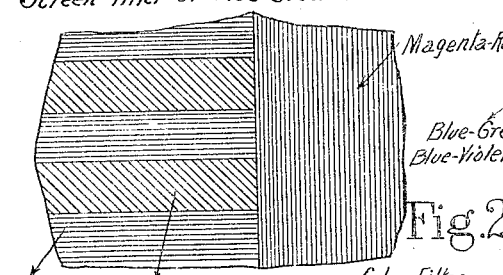
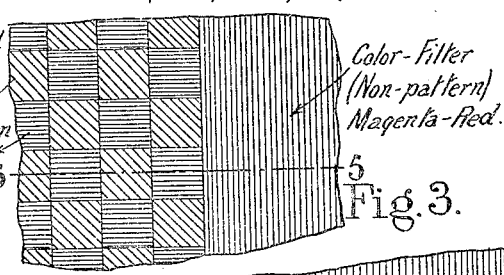
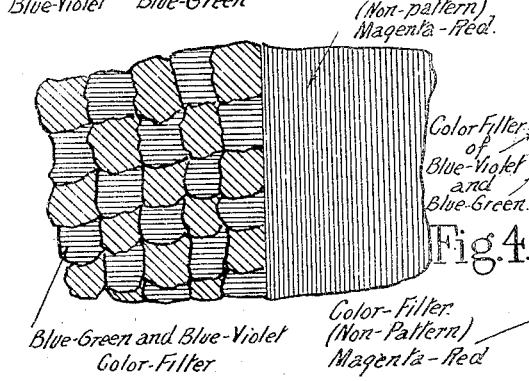
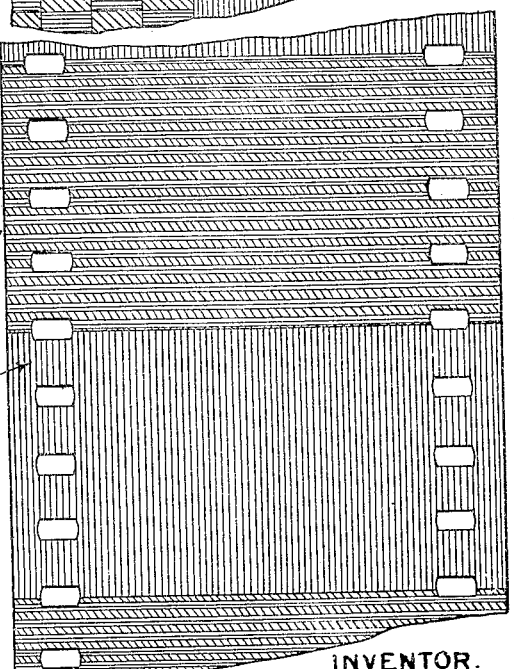
INVENTOR.
J. E. Thornton Patented Nov. 19, 1929

1,736,554

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

COLOR PHOTOGRAPHY AND SENSITIZED MATERIAL THEREFOR

Application filed July 1, 1925, Serial No. 40,961, and in Great Britain August 2, 1924.

This invention relates to the structure and manufacture of a special form of sensitive film-material for the production of kinematograph negatives, which will enable three colors to be analyzed and represented in or by two negatives (one representing two colors and the other representing only one color of the triad); both formed upon a double width film; and to film-material of similar construction for making reproductions or positives from the negatives referred to, preferably upon a double-width film; and to the production of multi-color negatives and positives by means of such film materials; the negatives for the analysis of three colors being produced simultaneously by one lens and one exposure in two picture areas preferably side by side upon a double-width film, and the positives comprising three colors being produced in two picture-areas preferably upon one double-width thin film which is afterwards cut to form two thin films which are eventually superimposed and cemented to form one.

According to the invention the film material in the preferred form for either negatives or positives comprises a double-width film with two picture areas side by side, one area or half of the film being provided during manufacture with a two-color screen filter and the other area or half of the film with a single-color (non-pattern) filter coated with a sensitive emulsion so that one portion of the film will reproduce two colors and the other portion reproduce only the remaining color of the original subject; in a modified form the negative film may have the picture areas alternating upon a single width film.

Fig. 1 is a sectional plan of a strip of sensitized film material of double-width. On one-half is formed a screen-filter of two colors, such as blue-green and blue-violet. These colors are alternately interspersed and consist of extremely fine lines. In the drawing they are shown coarse for clearness. On the other half is formed a full-tone color-filter (non-pattern) of a single color such as magenta, orange-red, crimson or other suitable shade of red.

Fig. 2 is a sectional plan of part of Fig. 1 considerably enlarged.

Fig. 3 is a similar view showing the two colors on one half width arranged in squares.

Fig. 4 is a similar view showing the two colors on one half width arranged in dots as a mosaic pattern.

Fig. 5 is a transverse section on line 5—5 of Fig. 3.

Fig. 6 shows a modification in which the filters are arranged in alternating order upon a single-width strip, which is advantageous for use in single-width cameras, a screen filter of two colors being formed on one picture area consisting of extremely fine line and adjacent picture areas with a full tone color filter of a single color.

References to other patents

In my application Serial No. 711,251, filed May 5, 1924, I have described how a picture in four colors can be made upon a double-width film by means of four negatives each representing a single color, and alternatively by means of two negatives each representing two colors; in either case two are printed upon one half of the double-width positive film and the other two upon the other half; the film is next severed to form two single strips which are then superimposed and cemented to form one film in which the four colors are combined as one four-color picture. I have also described therein how four image-spaces are filled with only three colors, by duplicating one of the three, so that three-color pictures can be produced in one film by combination.

In the present invention it is essential to form two camera images in two separate picture-areas, and it is preferred to form them side-by-side upon double-width negative film-material in one double-width camera, by one lens and a light-splitting device. The resulting negative then consists of a two-color mosaic (or screen) negative upon one half-width of film, and a complete section-image of the third color, in full-tone (or screenless) upon the other half-width. The invention is not however restricted to double-width material as will be understood from the alternatives hereinafter described, but such double-width material is preferred.

In the present invention partial interception of light is avoided, because there are two images formed by two light-beams and each receives the fullest possible amount. A very full volume of light therefore passes direct from the lens through an orange-red or magenta-red filter, so that a full-tone negative image representing the blue-green portions of the object is produced upon that portion of the film covered by the orange-red or magenta-red filter.

The remainder of the light passed by the prism, mirror, or other light-splitting device reaches the other picture-area of the film and passes through a mosaic or screen-filter composed of green and violet to reproduce in the negative those portions of the picture which represent the magenta-red and yellow portions of the picture.

Therefore, in the resulting positive produced from such negatives blue-green is represented by an image of full-tones; whilst the other colors magenta-red and yellow are represented only by images of broken-tones (screen-mosaic pattern).

Although this is the preferred arrangement of screens and colors, they may be arranged in any other combination to give a particular result in another preponderating color. For example it may be desired to form the positive in red, green, and violet, instead of red, blue, and yellow, in which case the negative and positive filters need modifying to give that result in the positive. By another modification the preponderating color for landscapes may be green, and for masses of flowers or for gorgeous ceremonials crimson may preponderate, by suitable modification of the negative and positive filters. The description of colors is not necessarily exact, nor are the colors restricted to the combinations named, but they represent the usual colors and combinations of standard practice.

It is preferred to filter or represent the predominating color by the full-tone negative and the other two less predominating colors by the screen-mosaic negative. In the first described examples the blue-green has been shown as recorded by the full-tone negative.

Manufacture of the film material

*Film-material.*—In carrying out the invention the material is constructed with a base or support of celluloid or other transparent equivalent, of preferably double-width and in the case of negative material about .005 inch thick but in the case of the positive material the celluloid support is only .003 of an inch thick.

This is coated upon one side with an exceedingly thin layer of adhesive substratum of known type.

Upon this is coated a layer of colloid upon or in which the color-screen is to be formed.

If desired the color-screen layer and the substratum layer may be combined as one. Or the screen may be formed direct in or upon the celluloid of the support. I prefer however, the arrangement of separate substratum and screen, both formed of a colloid, and the following description therefore refers to such construction.

Upon one half-width of the base or support a color-screen for two colors is formed by means of alternating dots, lines or other mosaic pattern in exceedingly fine adjacent areas Figs. 2 to 4. This screen may consist of any two of the three colors, but green and violet are preferred. The construction and methods of manufacture are the same as those described in patent specification Serial No. 711,254, filed March 15, 1924, but with the colors arranged instead as hereinbefore described.

The other half-width of the base or support is covered with a one-color filter, which is orange-red in color if the other screen is of green and violet.

The film is next coated all over with an exceedingly thin adhesive substratum layer superimposed upon the two filters.

The film is next again coated all over both filters with a layer of high-speed gelatino-silver-bromide panchromatic emulsion, superimposed upon the substratum.

When dry the negative material is then ready for use by exposing in the camera with its celluloid side to the lens, its sensitized side away from the lens and its orange-red or magenta-red filter covering one half and its mosaic screen green and violet filter covering the other half of the sensitized layer, such screens being between the support and sensitized layer, in the case of the positive material it is then ready for printing.

All three colors of both filters remain a permanent part of the original material, and the single color-filter is not dissolved or removed, as in the Hess-Ives process.

After exposure or printing this film is developed, fixed, washed and treated exactly the same as any ordinary monochrome film.

As the filters of the negative-film-material are complementary in color to those of the original the negatives will be complementary negatives, and this is rectified by the positives in which the colors will be again complementary and will correspond to those of the original.

Perforation and registration

Any desired system of perforation and registration may be used in the application of the present invention.

But I much prefer to make use of the onehole method for registration and the usual set of perforations for traction purposes.

To ensure accuracy of registration the highest possible standard of precision is necessary in the perforating machinery and extreme vigilance upon the part of the operator attending to the perforating of both the negative film and the positive.

Negatives produced upon negative-film-material such as described may also be used for making three reproduced negatives, positives, or printing-clichés in monochrome, one from each color of the original negative, by the usual well-known methods of separation and reproduction. Positive prints can then be made from them, by any of the known processes, as three separate prints in three separate colors superimposed upon one support; or by printing upon two supports which are instead superimposed.

Or by suitable modification of the film-construction the negatives may be formed in alternating order, by the same method of light-splitting and simultaneous exposure, upon a single-width film of double length, from which printing-clichés can be made by copying on to two films upon which the two sets of images are arranged in direct instead of alternating sequence, or on to a double-width film.

In another modification the negatives can be made in alternating order one after the other, in two exposures, upon such a single-width strip, and extracted by reproduction afterwards as above stated. By this method it is possible to make the two original negatives in an ordinary single-width camera, but the value of simultaneous exposure is lost and the defect known as "fringing" is thereby introduced.

Or two lenses may be used, and both exposures made simultaneously, either upon a single strip, two single strips, or a double strip. This however introduces the defect known as "parallax".

But these lesser perfect methods are useful in cases where cameras of these particular types only are available, and they still permit of the invention being used in making the negative and positive films.

What I claim as my invention and desire to protect by Letters Patent is:—

1. A sensitized film-material for kinematograph pictures having a two-color screen filter on one half width thereof and a single-color screen filter on the other half width.

2. A double-width sensitized film-material for kinematograph pictures having a two-color screen filter upon one half width and a single-color filter upon the other half width.

3. A sensitized film-material for kinematograph pictures having a two-color screen filter on one half the area thereof and a single color filter on the other half the area thereof and a layer of panchromatic gelatino-silver-bromide emulsion coated and superimposed upon the two filters.

In testimony whereof I have hereunto set my hand.

JOHN EDWARD THORNTON.